March 3, 1953 E. E. KITTRIDGE 2,629,951
PRICE INDICATING STRUCTURE
Filed April 5, 1949 2 SHEETS—SHEET 2
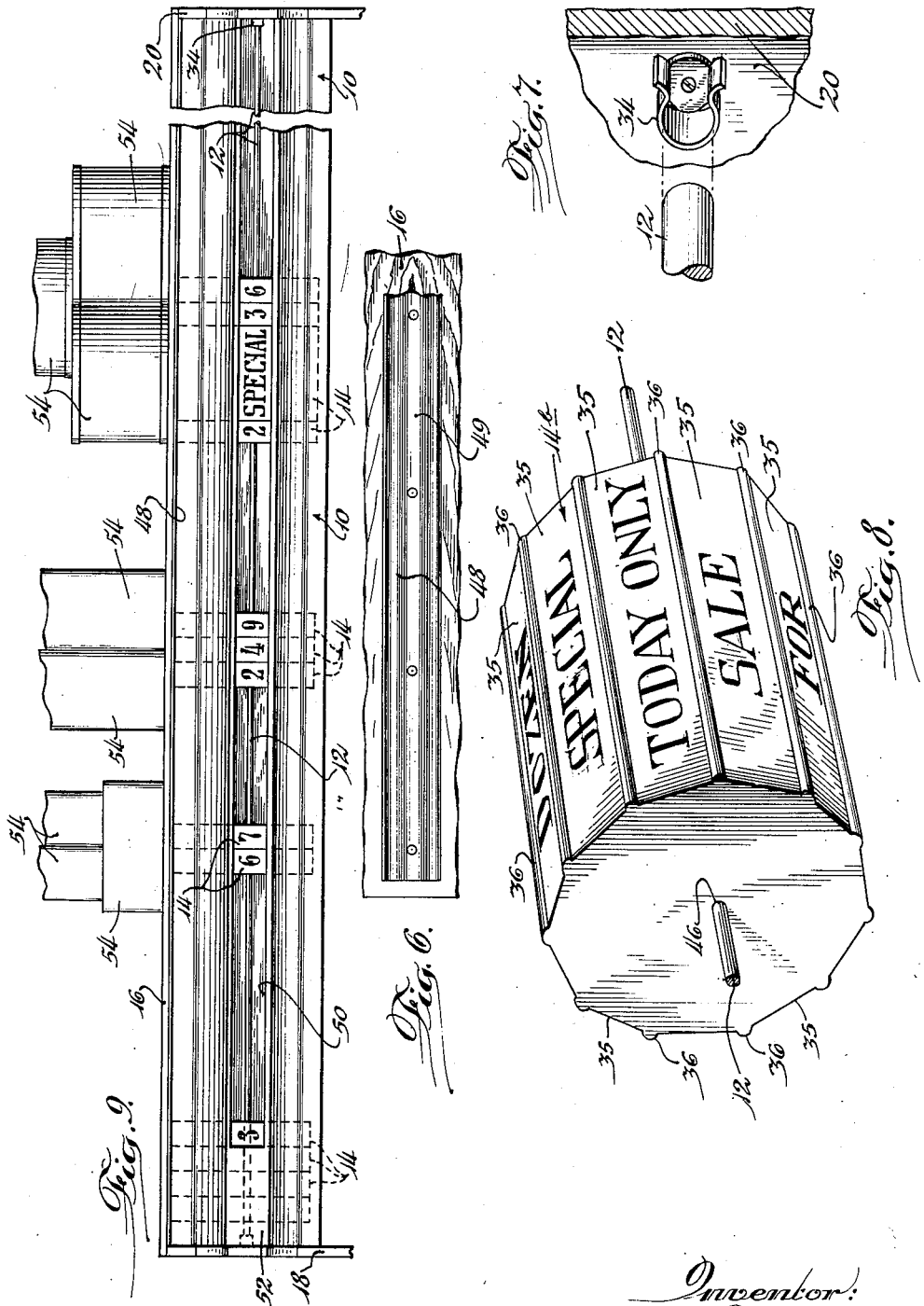
Inventor:
Edward E. Kittridge
By Hinkle, Horton, Ahlberg, Hansmann & Kupper
Attorneys.

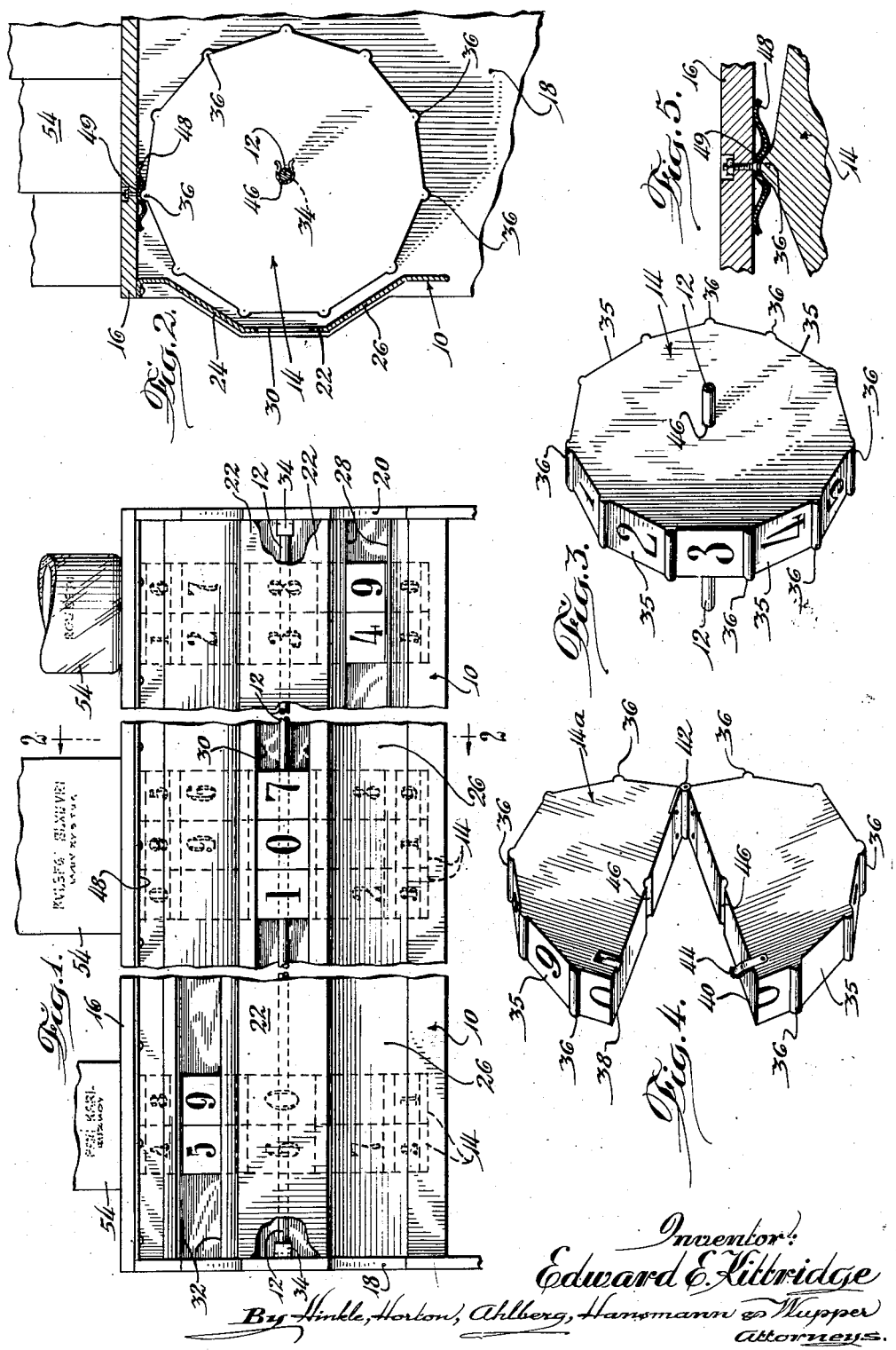

Patented Mar. 3, 1953

2,629,951

UNITED STATES PATENT OFFICE 2,629,951

PRICE INDICATING STRUCTURE

Edward E. Kittridge, Chicago, Ill.

Application April 5, 1949, Serial No. 85,687

8 Claims. (Cl. 40—5)

The present invention relates to a price indicating structure and, more particularly, relates to a new and improved changeable price display means embodying a plurality of slidable and rotatable price indicating wheels.

The primary object of the invention is to provide a new and improved price indicating device particularly suitable for use in retail supermarkets wherein any combination of price indicating indicia are obtainable, and wherein said price indicating indicia may be easily and expeditiously changed at the will of the party having authority to regulate the prices, but wherein such price indicating means are out of the way so as not to be easily disturbed by customers.

Another object of the invention is to provide a price indicator which is pleasing in appearance and conspicuous.

A further object of the invention is to provide a price indicating structure embodying each of the foregoing objectives which may be manufactured and installed at low cost.

Other objects and advantages of the present invention will be clearly brought out in the description and accompanying drawings, in which:

Fig. 1 is a front elevational view of the assembled structure;

Fig. 2 is an end section of the assembled structure, taken along plane 2—2 of Fig. 1;

Fig. 3 is a perspective view of one form of indicating wheel embodied by the invention;

Fig. 4 is a perspective view of another and different form of indicating wheel;

Fig. 5 is a partial end sectional view taken from Fig. 2, showing certain features of the invention in greater detail;

Fig. 6 shows an additional feature of the invention in greater detail;

Fig. 7 is a perspective view of the rod mounting means included as part of the invention;

Fig. 8 is a perspective view of a variation in the indicating wheels; and

Fig. 9 is a front elevational view of the assembled price indicating structure installed in cooperation with a display shelf.

With reference to the drawings, it may be seen in Figs. 1, 2 and 9 thereof that the present invention is directed to a new and improved device for installation in cooperation with a store merchandise display shelf or counter for indicating the sale price of the merchandise displayed, the various embodiments and functions of which have been dictated by the needs and requirements of the present day cash and carry self-service supermarkets. The present general practice followed by markets in the pricing of merchandise is to hang price tags on the shelves below each group of goods, or to insert price tags into frames mounted along the outer edges of the shelves. Because of the daily fluctuation in food prices, it is necessary that the price tags be changed on many articles at least once every day and often two or three times a day. To facilitate the changing of the price tags to conform with price changes, it is important that the tags be readily accessible for expeditious manipulation by the store personnel. While the price tags presently in use by large stores and markets may meet this requirement, the price tags are at the same time equally accessible to the public who frequently slide the price tags out of place, or knock them down in taking merchandise from the shelves, and it is quite common for children to completely remove the tags or to purposely disarrange them, with the result that the rearrangement and replacement of price tags in a super-market must be done several times each day.

The manner in which the present invention fulfills the need for a new and improved changeable price indicating device will be fully understood from the description of the invention, which, in its various elements, comprises a fronting plate 10 fastened to the outer edge of a shelf and depending downwardly therefrom, a round metal rod 12 mounted behind the fronting plate and underneath the shelf, a plurality of indicating wheels 14 slidably and rotatably mounted on said rod, each of said wheels being provided with numeral or letter indicia about the periphery thereof.

Referring particularly to Figs. 1 and 2 of the drawing, a fronting plate 10 is shown secured to the underside and forward edge of a display shelf 16 and depending downwardly therefrom a distance slightly greater than the diameter of the indicating wheels 14, and extending from one vertical shelving wall 18 to the next shelving wall 20.

Figs. 1 and 2 show a preferred form of fronting plate 10 having a vertical face portion 22, an upwardly facing face portion 24, and a downwardly facing face portion 26; the inside angle between the three faces 22, 24 and 26 of the fronting plate 10 corresponding to the external angle of the peripheral faces of the indicating wheels. The face portions 22, 24 and 26 of the fronting plate 10 are, in the alternative, longitudinally windowed as indicated at 28, 30 or 32 for the viewing and top and bottom framing of the indicia appearing on the periphery of the indicating wheels such that every part of the indicating wheels are hidden from view except the face portion presented to the window, it being understood that the fronting plate will have only one windowed face, and that said window may, in the alternative, be either along the upper, central or lower face portions, depending upon the height of the shelf in respect to the customers' line of vision. For instance, if used on a lower shelf the upwardly facing portion 24 will be windowed as indicated at 32, if the shelf is approximately at eye level, the middle or vertical face portion 22 will be windowed, as indicated at 30, and if used as an upper shelf the downwardly facing face portion 26 will be windowed, as indicated at 28. The fronting plate 10, alternatively windowed, is clearly illustrated in Fig. 1.

The fronting plate may be made of thin sheet metal having a longitudinal cut-out portion running the length of one of the faces thereof to provide the window, or preferably, it may be made of transparent plastic or glass which has been frosted or painted so as to render the concealing portions thereof opaque, leaving a central, upper or lower transparent window.

With further reference to Figs. 1 and 2 of the drawings, a smooth round metal rod 12 is shown mounted on and extending between the two end shelving walls 18 and 20. It is preferred that the rod 12 be held in place by a suitable form of clip bracket 34 of the type shown in Fig. 7, said brackets being located on the inside surface of the shelving walls 18 and 20 such that the rod 12 will be securely held in place and may be quickly installed or removed without the aid of a tool.

The indicating wheels 14, 14a, 14b shown in the various views of the drawing are essentially thickened disks having their peripheries made up of a series of numeral or other indicia bearing facets 35. It is preferred that these wheels or disks have eleven peripheral faces or facets geometrically arranged such that a side elevational view of the wheels is characterized by an eleven sided polygon, as shown in Fig. 2. It is to be understood, however, that these wheels may be provided with a lesser or greater number of peripheral faces if so desired. These indicating wheels are further provided with a raised or beaded projecting ridge 36 between each of said peripheral faces having the function of stops in the positioning of the wheels as they are rotated about the supporting rod 12.

Fig. 4 shows a modified form of indicating wheel 14a comprising two half sections 38 and 40 hinged at their periphery as indicated at 42 and having a spring catch or fastener 44 for securing the hinged half sections in engaged and closed position to effect an indicating wheel substantially identical to that shown in Fig. 3.

The indicating wheels may be variously formed from any suitable material and may be either hollow or solid. However, it is contemplated that these wheels can be economically and attractively molded in plastic according to modern methods.

As shown in their various views, each of the indicating wheels is provided with a central opening 46 for rotatable and slidable mounting on the supporting rod 12.

The invention further provides for the use of a spring metal strip 48 in the form of a modified M illustrated in Figs. 2 and 5 associated with the projecting ridges 36 of the indicating wheels for the accurate positioning and holding of the wheels after they have been manually pushed or rotated along or about the rod 12. As shown, this metal strip is secured to the underside of the shelf 16 parallel to the forward edge thereof and positioned with respect to the rod 12 and the wheels 14 such that when any one of the projecting ridges 36 is in engagement with the depressed portion 49 of the strip, one face of the wheel will always be centered and in the same plane with the fronting plate window. Preferably, the metal M shaped strip 48 is of one piece running the entire distance between the end shelving walls 18 and 20 to cooperate with the wheels at any position along the supporting rod 12. It may now be understood that the metal strip 48 and the wheel ridges 36 serve the dual purpose of facilitating correct positioning of the peripheral faces of the wheels as they are rotated about the supporting rod 12, and as a friction means for holding the wheels in set positions on said rod.

In practice, it is contemplated that an adequate number of indicating wheels may be mounted on the supporting rod under each section of store shelving to be arranged in various combinations and positions along the rod 12 to meet the every day price changes of the goods displayed. Wheels not in use may be either entirely removed from their supporting rod or, more readily, merely pushed to one or the other end of the rod and rotated so that the face presented to the window in the fronting plate is blank. The split form of indicating wheel shown in Fig. 4 has the advantage of being mountable on the supporting rod without removing the rod.

In Fig. 8 of the drawing is illustrated an indicating wheel 14b, similar to that of Fig. 3 except that it has been elongated to accommodate the printed indicia shown. Such a modification in the indicating wheels is particularly adaptable to the price display structure towards which the present invention is directed and is included to illustrate the possibilities and scope of the invention. Of course, it is to be understood that the indicating wheel shown in Fig. 8 may be either of solid one piece construction or may be of the split wheel construction of the indicating wheel shown in Fig. 4.

Having fully described the various elements embodied in the present invention, attention is now given to the assembled price display structure and the manner in which each of said elements cooperates with the other to effect the objectives sought.

Fig. 9 of the drawing is illustrative of the completely assembled price display structure in cooperation with one section of a store display shelf, as represented by the shelf 16 and the shelf supporting walls 18 and 20. On top of the shelf 16, represented by 54, are merchandise of different kinds and of different prices. Visible through the central window 50 of the fronting plate 52 are the numeral indicia appearing on the vertically disposed faces of the indicating wheels. To the left of the shelving section are shown a number of wheels not in use and completely hidden by the fronting plate 52 which has its central window terminated a distance from the end wall.

Arrangement of the indicating wheels may be easily accomplished by reaching under the fronting plate and sliding a sufficient number of the wheels along the rod to locate them directly under the goods to be priced, each wheel then being rotated to present the desired price label in view through the window of the fronting plate.

While an attempt has been made to include in the foregoing description of the invention certain preferred variations and modifications that have come to the mind of the applicant, it is obvious that other minor changes may be made in form and construction of the invention without departing from the basic concept and spirit thereof. It is not, therefore, desired to confine the invention to the exact forms herein shown and described, but it is desired to include all such variations as properly fall within the scope of the following appended claims.

Having thus described the invention, what is claimed as new is:

1. In a changeable price display structure of the type described, a windowed fronting plate, a longitudinally extending rod member positioned behind said plate and spaced therefrom, one or more wheels each having an axial opening through which said rod extends and by means of which it is movably mounted on said rod, said rod being substantially greater in length than is required by the total number of wheels mounted thereon, each of said wheels being provided with suitable indicia about its periphery, and said wheels being rotatable about and slidable longitudinally of said rod so as to be properly locatable behind said windowed fronting plate whereby the desired indicia is visible through said windowed fronting plate.

2. In a changeable price display structure of the type described, a longitudinally extending windowed fronting plate, a longitudinally extending rod member substantially coextensive with said plate positioned therebehind and spaced therefrom, one or more wheels each having an axial opening through which said rod extends and by means of which it is movably mounted on said rod, said rod being substantially greater in length than is required by the total number of wheels mounted thereon, each of said wheels being provided with suitable indicia about its periphery, and said wheels being rotatable about and slidable longitudinally of said rod so as to be properly locatable behind said windowed fronting plate whereby the desired indicia is visible through said windowed fronting plate.

3. In a changeable price display structure of the type described, a windowed fronting plate, a longitudinally extending rod member positioned behind said plate and spaced therefrom, one or more wheels each having an axial opening through which said rod extends and by means of which it is movably mounted on said rod, each of said wheels being diametrically split so as to be mountable on said rod at any point intermediate the ends thereof, each of said wheels being provided with suitable indicia about its periphery, and said wheels being rotatable about and slidable longitudinally of said rod so as to be properly locatable behind said windowed fronting plate whereby the desired indicia is visible through said windowed fronting plate.

4. In a changeable price display structure of the type described, a windowed fronting plate, a longitudinally extending rod member positioned behind said plate and spaced therefrom, one or more wheels each having an axial opening through which said rod extends and by means of which it is positioned on said rod, each of said wheels comprising diametrically mating complementary halves, and hinge means connecting said halves together so that said wheels may be mounted on and demounted from said rod at any point intermediate the ends thereof, each of said wheels being provided with suitable indicia about its periphery, and said wheels being rotatable about and slidable longitudinally of said rod so as to be properly locatable behind said windowed fronting plate whereby the desired indicia is visible through said windowed fronting plate.

5. A changeable price display structure in combination with a shelving structure, comprising a depending windowed fronting plate secured to a shelf, and extending laterally the full extent of said shelf, a longitudinally extending rod member positioned behind said plate and spaced therefrom, one or more wheels each having an axial opening by means of which it is movably mounted upon said rod, each of said wheels having an equal number of indicia bearing peripheral faces and a raised portion between each of said faces, said wheels being rotatable about and slidable longitudinally of said rod so as to be properly locatable behind said windowed fronting plate whereby the desired indicia is visible therethrough, and means associated with the shelf for engaging said raised portions to hold said wheels in set positions along and about said rod.

6. A changeable price display structure in combination with a shelving structure, comprising a downwardly depending windowed fronting plate secured to a shelf at the outer edge thereof, and extending laterally the full extent of said shelf, a longitudinally extending rod member positioned behind said plate underneath the shelf and spaced therefrom, one or more wheels each having an axial opening by means of which it is movably mounted upon said rod, each of said wheels having an equal number of indicia bearing peripheral faces and a raised portion between each of said faces, said wheels being rotatable about and slidable longitudinally of said rod so as to be properly locatable behind said windowed fronting plate whereby the desired indicia is visible therethrough, and means secured to the underside of the shelf for engaging said raised portions to hold said wheels in set positions along and about said rod.

7. A changeable price display structure in combination with a shelving structure, comprising a depending windowed fronting plate secured to a shelf at the outer edge thereof, a longitudinally extending rod member running the entire distance underneath the shelf positioned behind said plate and spaced therefrom, one or more wheels each having an axial opening by means of which it is movably mounted upon said rod, each of said wheels having an equal number of indicia bearing peripheral faces and a raised portion between each of said faces, said wheels being rotatable about and slidable longitudinally of said rod so as to be properly locatable behind said windowed fronting plate whereby the desired indicia is visible therethrough, and a spring strip secured to the underside of the shelf for engaging said raised portions to hold said wheels in set positions along and about said rod.

8. A changeable price display structure in combination with a shelving structure, comprising a depending windowed fronting plate secured to a shelf at the outer edge thereof, a longitudinally extending rod member running the entire distance underneath the shelf positioned behind said plate and spaced therefrom, means removably securing said rod member to the shelving structure, one or more wheels each having an axial opening by means of which it is movably mounted upon said rod, each of said wheels having an equal number of indicia bearing peripheral faces and a raised portion between each of said faces, said wheels being rotatable about and slidable longitudinally of said rod so as to be properly locatable behind said windowed fronting plate whereby the desired indicia is visible therethrough, and a spring strip secured to the underside of the shelf for engaging said raised portions to hold said wheels in set positions along and about said rod.

EDWARD E. KITTRIDGE.

REFERENCES CITED

The following references are of record in the file of this patent:

UNITED STATES PATENTS

| Number | Name | Date |
| --- | --- | --- |
| 601,879 | McNutt | Apr. 5, 1898 |
| 630,855 | Brooks | Aug. 15, 1899 |
| 1,472,193 | Poirier | Oct. 30, 1923 |
| 1,473,035 | Gottfried | Nov. 6, 1923 |
| 1,774,015 | Johnson | Aug. 26, 1930 |
| 1,998,836 | Fullerton | Apr. 23, 1935 |
| 2,342,325 | Bliss | Feb. 22, 1944 |
| 2,349,452 | Musolino | May 23, 1944 |
| 2,421,513 | Lofstrom | June 3, 1947 |